United States Patent [19]

Sturges

[11] 4,095,661
[45] Jun. 20, 1978

[54] WALKING WORK VEHICLE

[75] Inventor: James R. Sturges, Washington, Ill.

[73] Assignee: Caterpillar Tractor Co., Peoria, Ill.

[21] Appl. No.: 795,034

[22] Filed: May 9, 1977

[51] Int. Cl.² .............................................. B62D 57/02
[52] U.S. Cl. ........................................ 180/8 E; 305/3
[58] Field of Search .................... 180/8 R, 8 B, 8 BA, 180/8 C, 8 D, 8 E, 8 F; 305/1, 2, 3, 4, 5

[56] References Cited

U.S. PATENT DOCUMENTS

| | | | |
|---|---|---|---|
| 1,376,717 | 5/1921 | Mauger | 180/8 B |
| 1,603,934 | 10/1926 | Bennett | 180/8 F |
| 2,491,064 | 12/1949 | Urschel | 180/8 D |
| 3,135,345 | 6/1964 | Scruggs | 180/8 E |
| 3,512,597 | 5/1970 | Baron | 180/8 R |
| 3,522,859 | 8/1970 | Thring | 180/8 F |

Primary Examiner—John A. Pekar
Attorney, Agent, or Firm—John L. James

[57] ABSTRACT

A walking working vehicle has a plurality of separate, movable feet positioned along side portions of the vehicle. Elements are provided for connecting each foot to the frame and the power source for controllably moving each foot in a preselected manner sufficient to move the vehicle along the ground at a substantially constant velocity and maintain the frame of the vehicle substantially parallel to the ground.

9 Claims, 6 Drawing Figures

WALKING WORK VEHICLE

BACKGROUND OF THE INVENTION

It has been determined that the operation of a walking vehicle is more efficient than wheel or track mounted vehicles. It therefore is desirable to provide an efficiently operating walking system for providing means for moving large work vehicles along the ground.

Although walking vehicles are not new in and of themselves, the heretofore utilized walking systems had undesirable properties of imparting a nonuniform motion and/or jerky vertical motions to the vehicle.

This invention therefore resides in a walking system of a work vehicle which is of a construction sufficient to impart a substantially uniform velocity to the vehicle and maintain the vehicle substantially parallel to the ground during the operation thereof.

DETAILED DESCRIPTION

Figure 1:
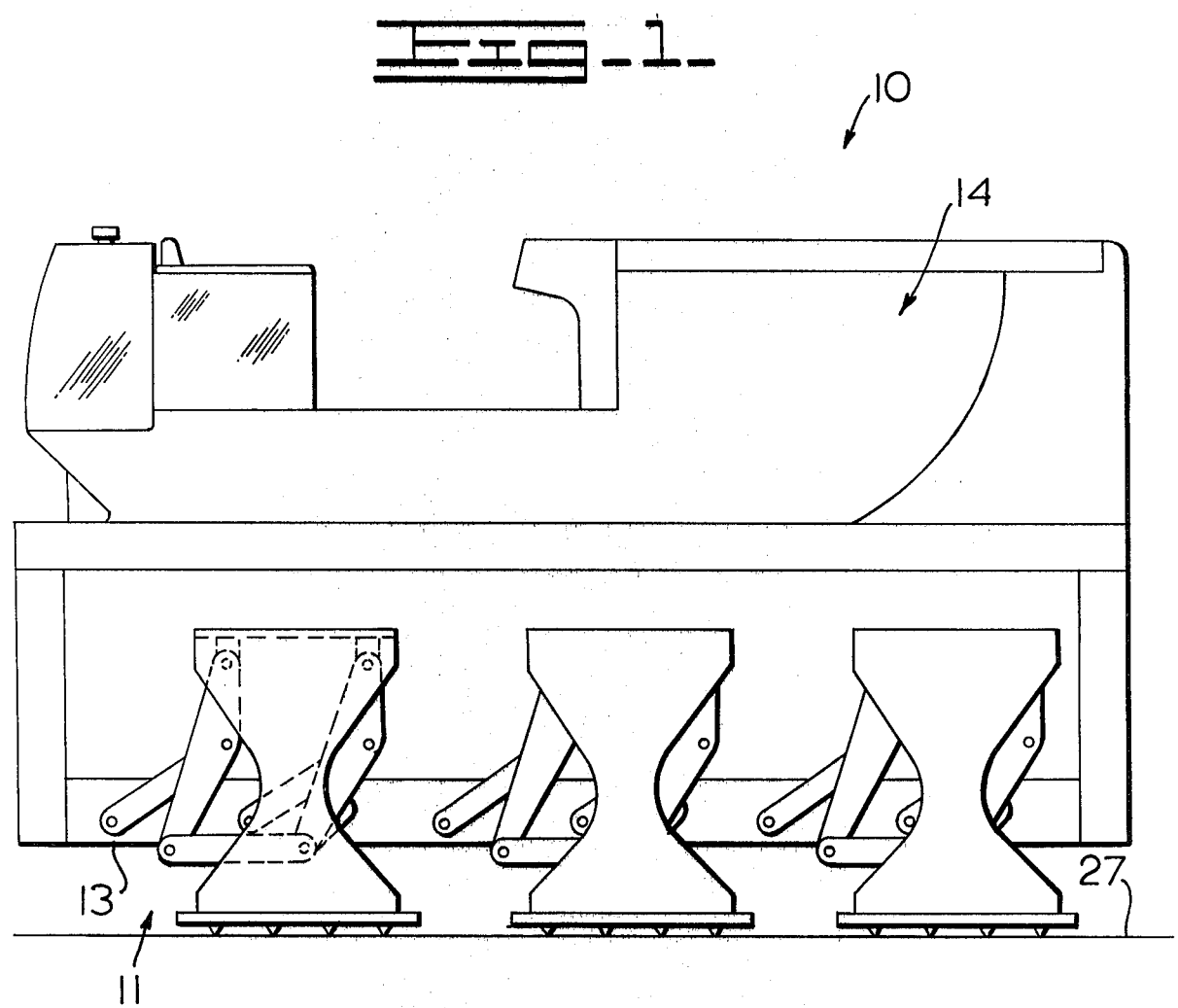
FIG. 1 is a diagrammatic side view of a vehicle having the apparatus of this invention.
Figure 2:
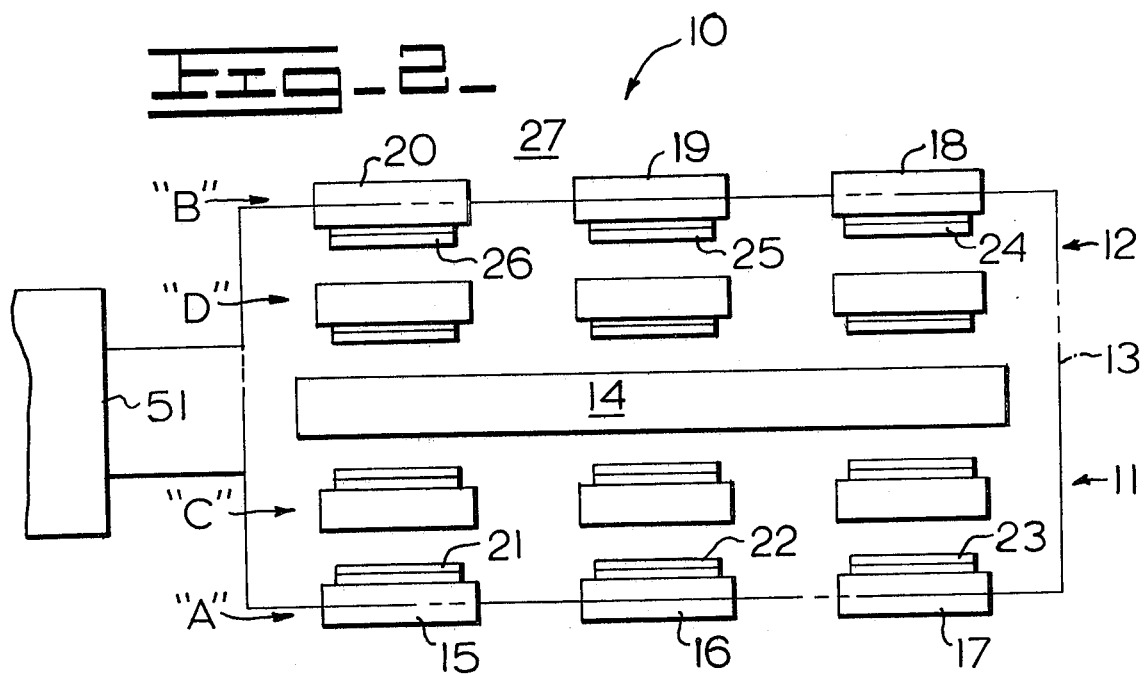
FIG. 2 is a diagrammatic top view of a portion of the vehicle showing the apparatus of this invention.

Referring to FIGS. 1 and 2, a work vehicle 10, such as a crawler tractor for example, has first and second opposed side portions 11, 12, a main frame 13, at least one power source 14 and a work element 51 (FIG. 2) mounted on the frame 13.

Referring to FIG. 2, the vehicle 10 has a plurality of separate, movable feet 15-20 positioned along respective side portions 11, 12 of the vehicle 10. Connecting means 21-26 are each associated with a respective foot 15-20 of the vehicle for connecting each foot 15-20 to the frame 13 and the power source 14. Each connecting means 21-26 is of a construction sufficient for controllably moving each foot 15-20 in a preselected manner sufficient to move the vehicle 10 along the ground 27 at a substantially constant velocity and maintain the frame 13 of the vehicle 10 substantially parallel to the ground 27 during movement of the vehicle 10.

Each of the feet 15-20 and associated means 21-26 are generally of common construction and the operation and detailed construction of only one of the feet 15 and connecting means 21 will be hereafter described for purposes of brevity.

Figure 3:
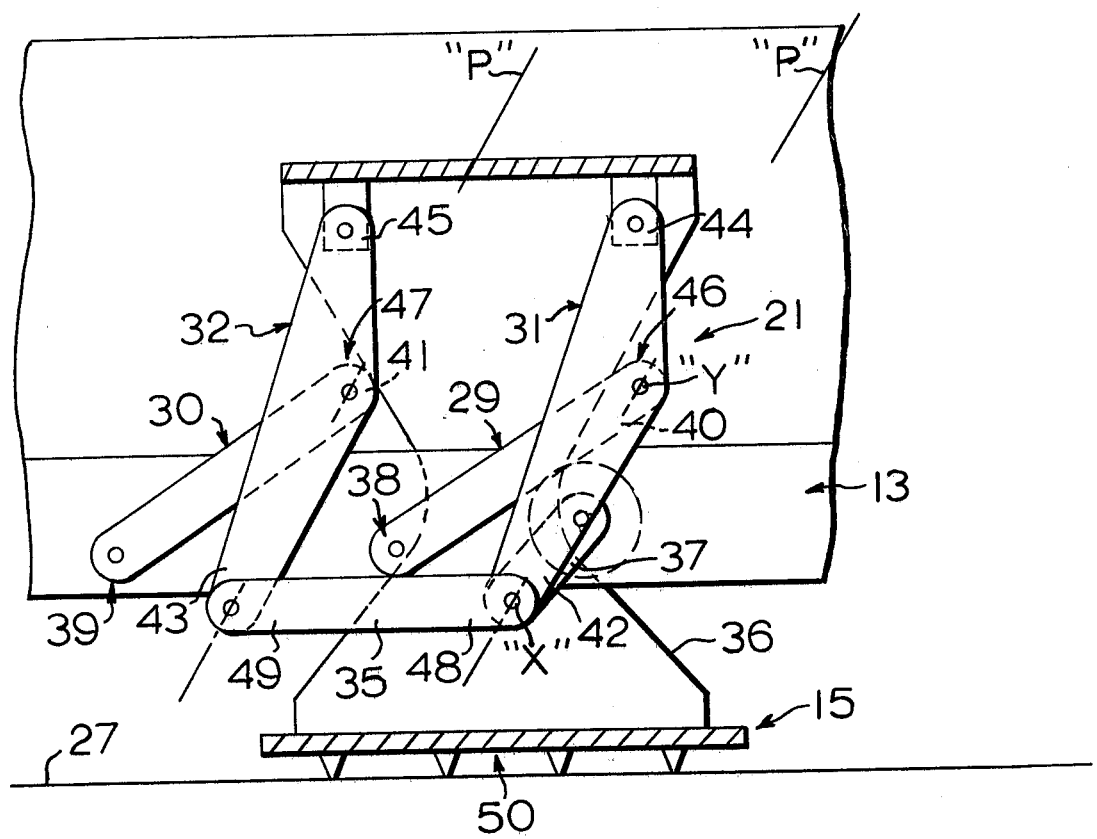
FIG. 3 is a diagrammatic side view of the linkage of one foot of this invention.

Referring to FIG. 3, each foot 15 of the vehicle is connected to its respective connecting means 21 at a plurality of spaced locations sufficient for maintaining the foot 15 substantially parallel to the frame 13 during movement of the foot 15 through its operating cycle. This aspect is important in providing good ground-to-foot contact and in maintaining the integrity of the ground over which the vehicle travels.

The pathway followed by each foot 15 is preferably substantially symmetrical about a respective vertical axis in order to provide similar movement of the vehicle 10 during forward and reverse movements.

Means (not shown) is associated with at least a portion of the connecting means of each side of the vehicle for controllably altering the cycle rate of the associated feet on a selected side of the vehicle 10 for turning the vehicle 10. This means can be a separate power source, gear system, or other means known in the art.

In the embodiment of FIG. 3, the connecting means 21 comprises a first pair of spaced apart connecting elements 29, 30, a second pair of spaced apart connecting elements 31, 32, a connecting member 35, second means 36 for pivotally connecting the foot 15 to each associated second connecting elements 31, 32, and third means 37 for connecting one of the connecting elements to the power source 14. The third means 37 can be, for example, a crank connected to one of the second connecting elements 31.

The first connecting elements 29, 30 have respective first and second end portions 38, 39 and 40, 41, and are pivotally connected at the first end portion 38, 39 to the frame 13.

The second connecting elements 31, 32 each have a first end portion 42, 43, a second end portion 44, 45 and a middle portion 46, 47. The second connecting elements 31, 32 are each pivotally connected to the second end portion 40, 41 of a respective first connecting element 29, 30 at locations on the second connecting elements 31, 32 sufficient for maintaining the first connecting elements 29, 30 substantially parallel relative one to the other during the operation cycle of the respective foot 15.

The connecting member 35 is pivotally connected at each end portion 48, 49 to a respective first end portion 42, 43 of the second connecting elements 31, 32 at spaced locations sufficient for maintaining a ground contacting surface 50 of the foot 15 substantially parallel with the frame 13 during the operating cycle of the foot 15.

It should be noted that the foot 15 is pivotally connected to the second pair of connecting elements 31, 32 at locations laterally spaced from a respective plane "P" defined by the first end portion and second end portion connections "X", "Y" of the respective second connecting elements 31, 32.

After the weight of the vehicle 10 is determined, one skilled in the art can easily select the number of feet for each side portion of the vehicle and the dimensions of the elements 29-37 for imparting the desired speed, ground contacting time per cycle, and load carrying capacity.

Referring to FIG. 2, there are at least three feet 15, 16, 17 and 18, 19, 20 positioned in each row "A", "B" on each side portion 11, 12 of the vehicle 10. In order to provide improved stability and greater load carrying capacity, there can be a plurality of rows "A", "C" and "B", "D" on each side portion 11, 12 of the vehicle 10.

The feet, 15-17 for example, on each row of the vehicle 10 are also preferably timed relative one to the other to have at least one-half of the number of feet of the row in contact with the ground during the complete operating cycle. Each foot 15 also is controlled so that the ratio of the time/cycle that said foot 15 is contacting the ground to the time/cycle said foot 15 is free from contact with the ground is a value greater than about 1.0, more preferably about 2.0. Ratios less than about 1.0 are undesirable because it makes for a rough, bumpy ride and vehicle elevation will change during travel.

Figure 4:
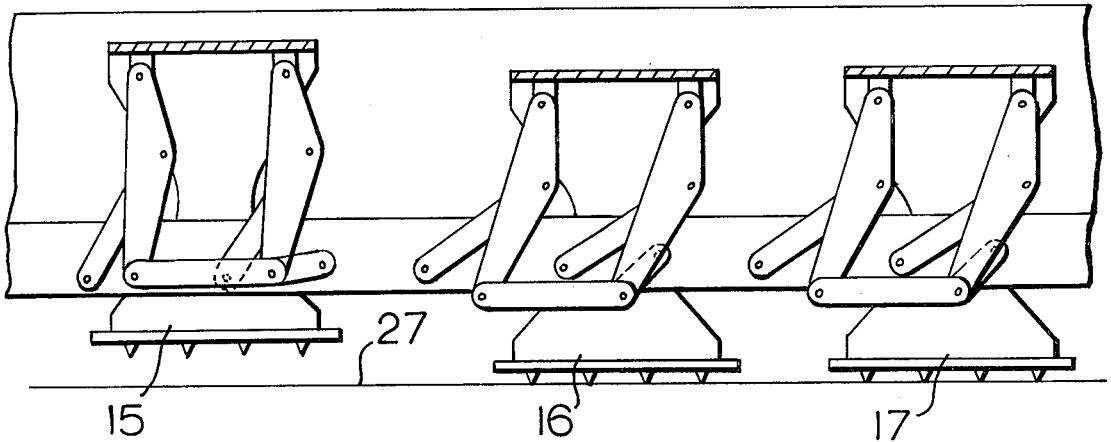
FIGS. 4-6 are diagrammatic side views of the relative positions of the feet 15-17.
Figure 5:
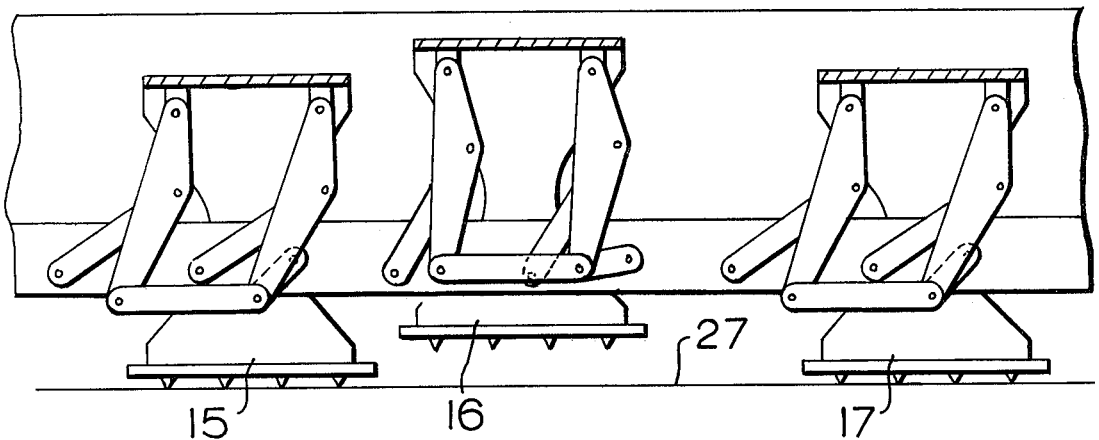
Figure 6:
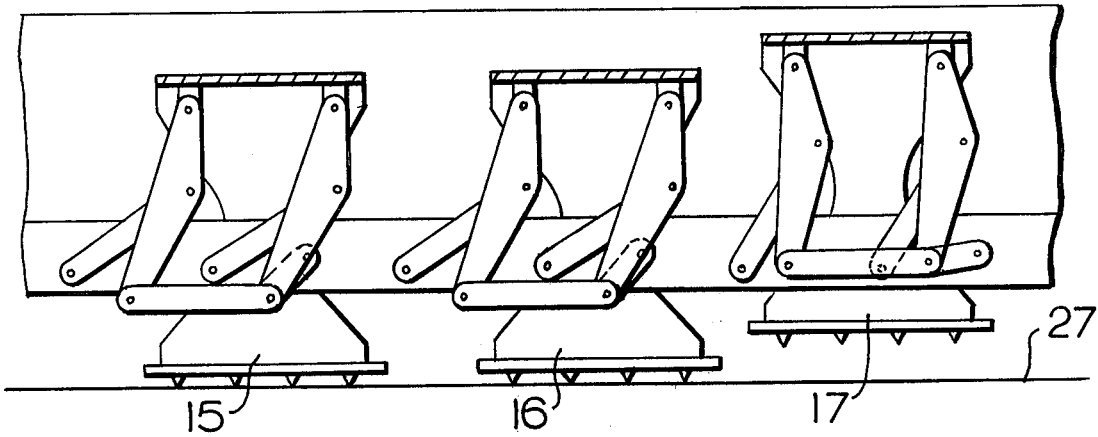

FIGS. 4-6 show example relative positions of the feet 15, 16, 17 during operation of the vehicle 10.

By so constructing the apparatus, the vehicle moves on a plane level to the ground, at a uniform velocity in response to a uniform rotational crank speed and has properties of reduced ground pressure, noise, and component wear with increased preservation of ground integrity and drawbar pull.

The apparatus of this construction provides a quick return of the feet when not in contact with the ground, thereby providing increased stability of the vehicle through increased ground contact for total feet and increased ground contact for an increased length of time per cycle per foot. The multi-foot walking vehicle also avoids waste of energy consumption.

An example vehicle of this type which had properties have found to provide excellent performance is as follows:

Foot pathway ... Length per height = 3.90

Foot pathway ... On ground time per off ground time = 2.0

Foot pathway ... Symmetrical on opposed sides of a vertical plane passing through midpoint of ground contacting portion of pathway.

Feet sequence ... Forces from each decelerating foot are counteracted by an associated accelerating foot.

Other aspects, objects, and advantages of this invention can be obtained from a study of the drawings, the disclosure, and the appended claims.

The embodiments of the invention in which an exclusive property or privilege is claimed are defined as follows:

1. In a work vehicle having first and second opposed side portions, a frame, a power source, and a work element, the improvement comprising:

a plurality of separate, movable feet positioned along each side portion of the vehicle; and means for connecting each foot to the frame and the power source for controllably moving each foot in a preselected manner sufficient to move the vehicle along the ground at a substantially constant velocity and maintain the frame of the vehicle substantially parallel to the ground, said connecting means of each foot comprising:

a first pair of spaced apart connecting elements each having first and second end portions and being pivotally connected at the first end portion to the frame;

a second pair of spaced apart connecting elements each having a first and second end portions and a middle portion and being pivotally connected to the second end portion of a respective first connecting element a connecting member pivotally connected at each end portion to a respective first end portion of a second connecting element at locations sufficient for maintaining the second pair of connecting elements substantially parallel one to the other during the operation thereof;

second means for pivotally connecting each foot to the second end portion of each second connecting element at spaced locations sufficient for maintaining a ground contacting surface of the foot substantially parallel with the frame during the operation thereof; and third means for connecting one of the connecting elements to the power source.

2. Apparatus, as set forth in claim 1, wherein the ratio of time per cycle that each foot is contacting the ground to the time per cycle that each foot is free from contact with the ground is a value of about 2.0.

3. Apparatus, as set forth in claim 1, wherein the pathway of each foot is substantially symmetrical about a respective vertical line bisecting said pathway.

4. Apparatus, as set forth in claim 1, including means for controllably altering the cycle rate of feet on one side portion of the vehicle relative to the cycle rate of feet on the opposed side portion of the vehicle for turning the vehicle.

5. Apparatus, as set forth in claim 1, wherein the third means comprises a crank.

6. Apparatus, as set forth in claim 1, wherein the feet are each pivotally connected to the second pair of connecting elements at locations laterally spaced from the plane defined by the first end portion and middle portion connections of the respective second connecting elements.

7. Linkage system for connecting a foot element to a frame comprising:

a first pair of spaced apart connecting elements each having first and second end portions and being pivotally connected at the first end portion to the frame;

a second pair of spaced apart connecting elements each having first and second end portions and a middle portion and being pivotally connected to the second end portion of a respective first connecting element at a location on the second end portion of the second connecting element sufficient for maintaining the first pair of connecting elements substantially parallel one to the other during the operation thereof;

a connecting member pivotally connected at each end portion to a respective first end portion of a second connecting element at locations sufficient for maintaining the second pair of connecting elements substantially parallel one to the other during the operation thereof;

second means for pivotally connecting the foot element to the second end portion of each second connecting element at spaced locations sufficient for maintaining a lower surface of the foot element substantially parallel during the operation thereof; and third means for connecting one of the connecting elements to the power source.

8. Apparatus, as set forth in claim 7, wherein the third means comprises a crank.

9. Apparatus, as set forth in claim 7, wherein the foot is pivotally connected to the second pair of connecting elements at locations laterally spaced from a plane defined by the first end portion and middle portion connections of the respective second connecting elements.

* * * * *